Aug. 13, 1968   P. GEYER   3,396,429
SELF-FEED RAM FOR EXTRUSION EQUIPMENT
Filed Aug. 1, 1966   10 Sheets-Sheet 9
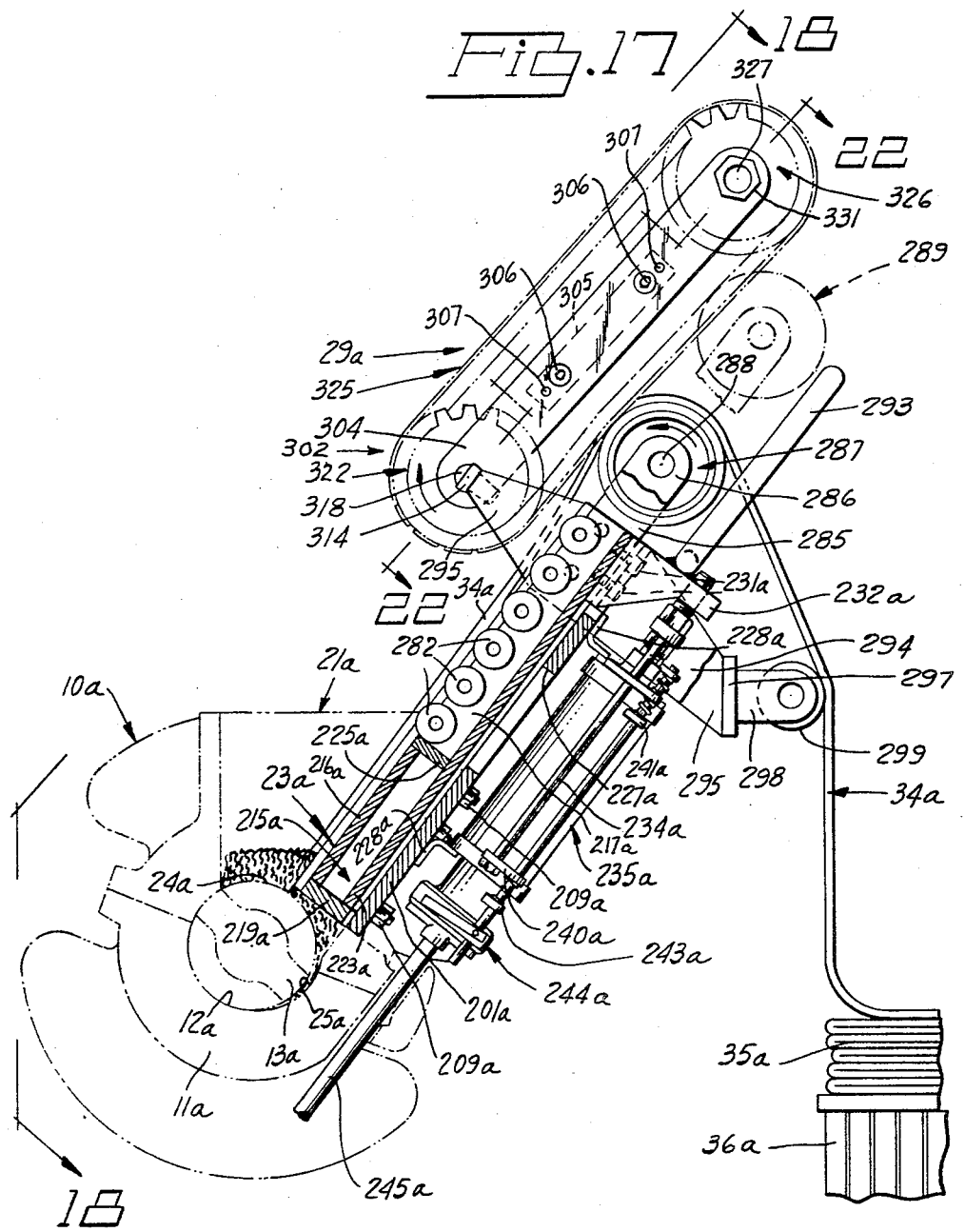
INVENTOR.
PAUL GEYER
BY
CHARLES A. BLANK
ATTORNEY

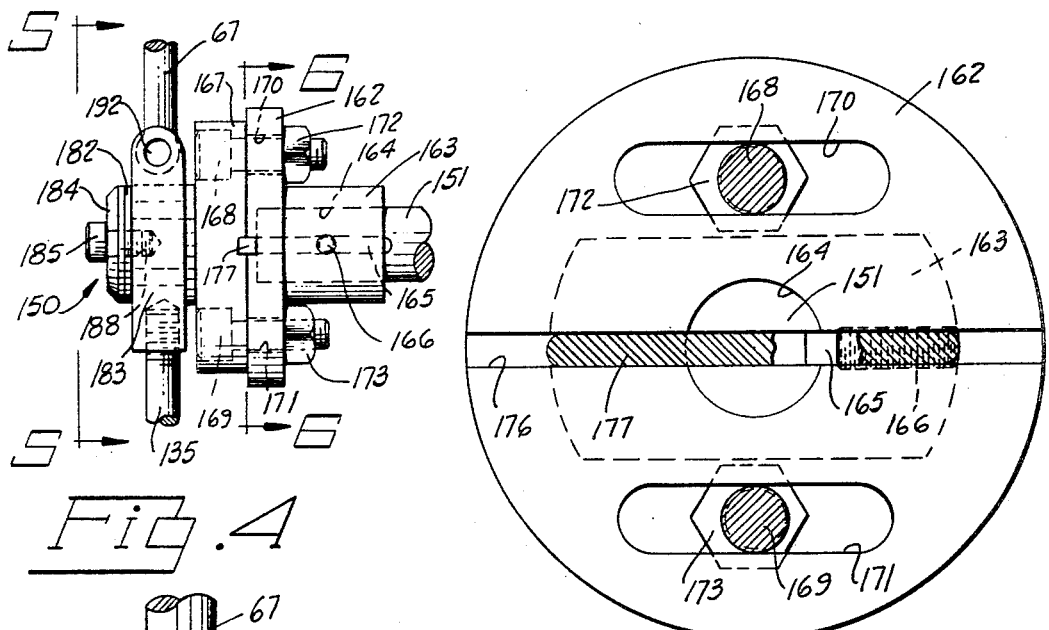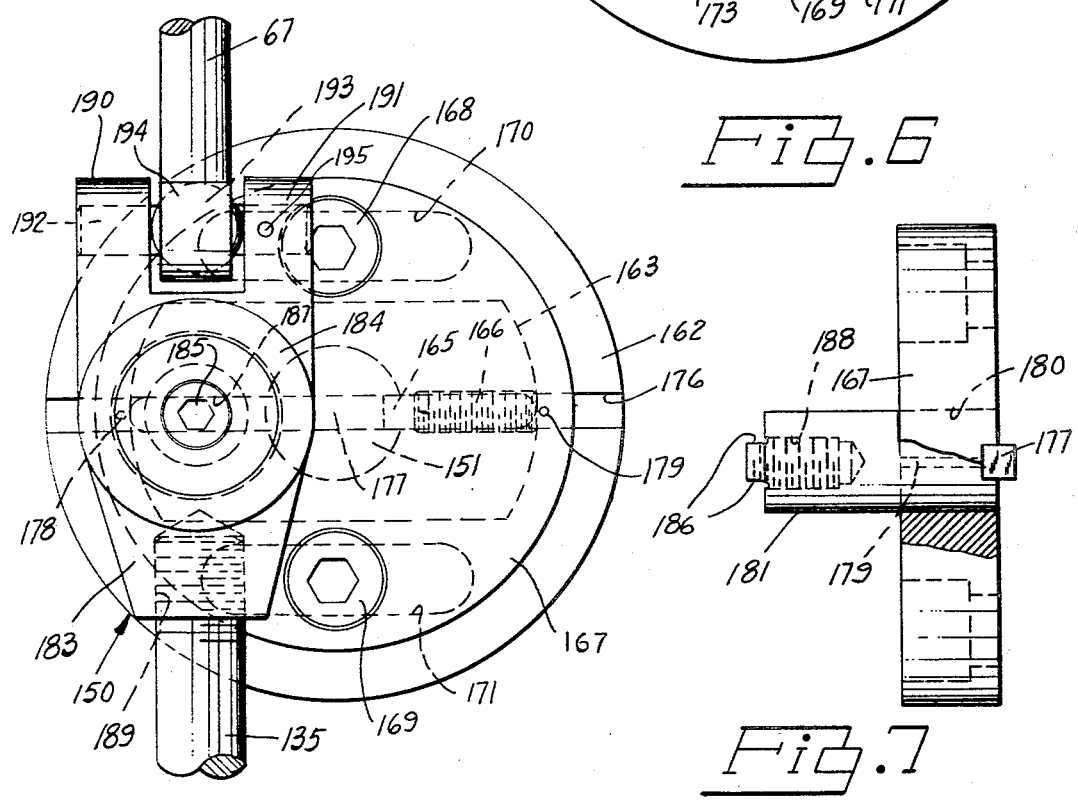

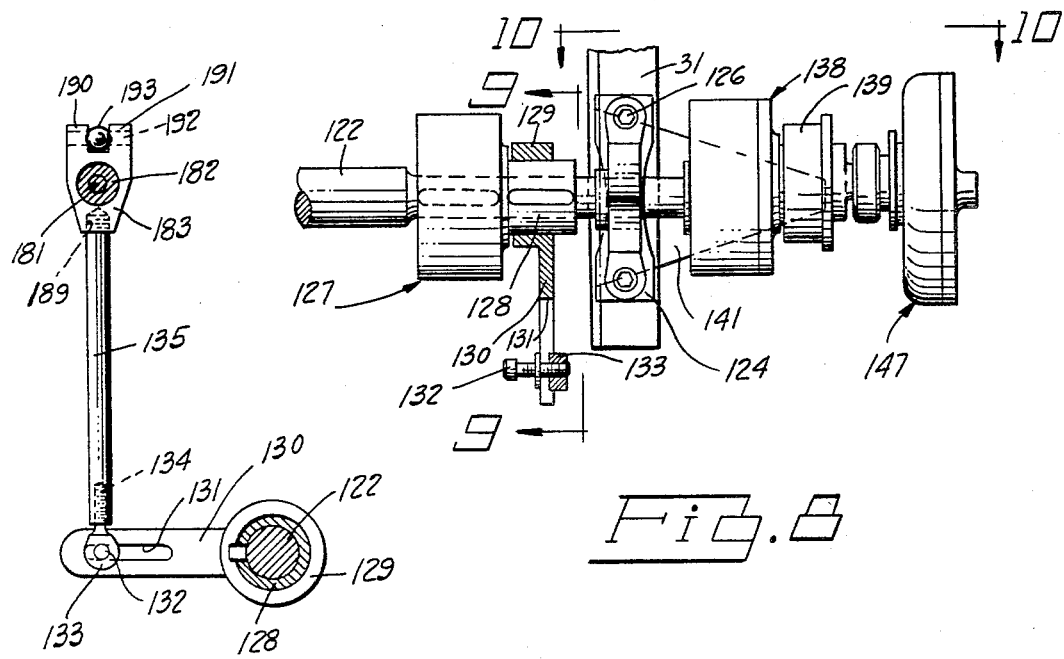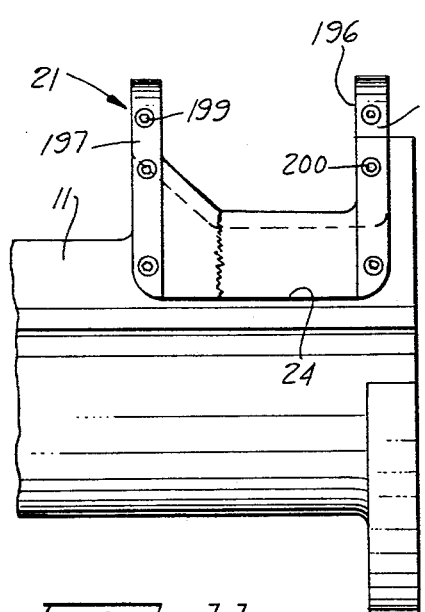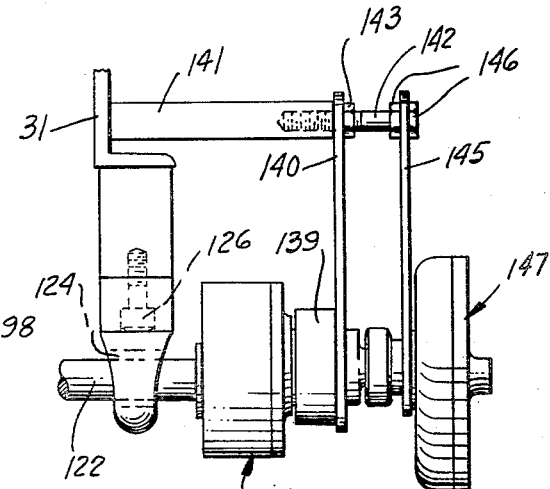

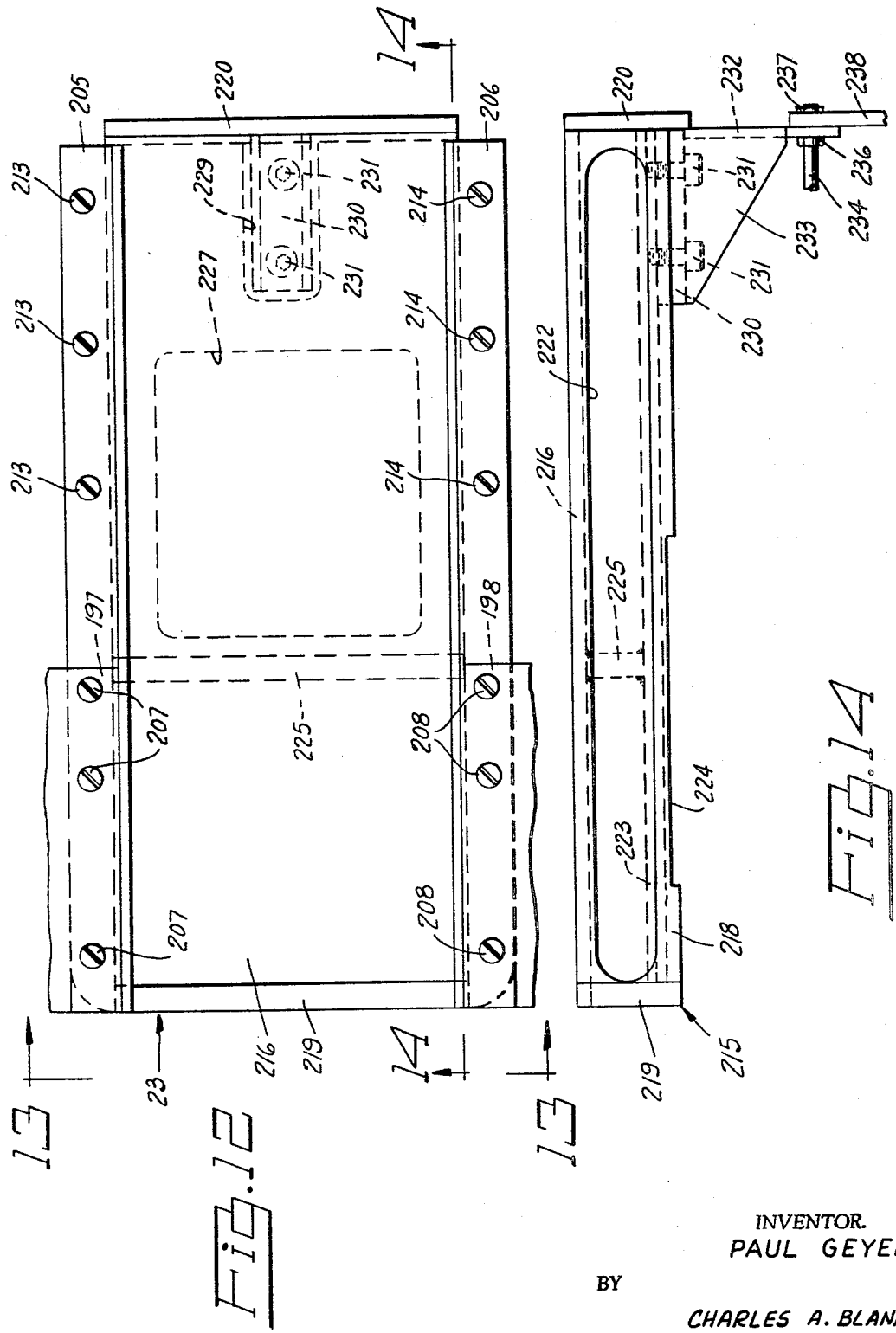

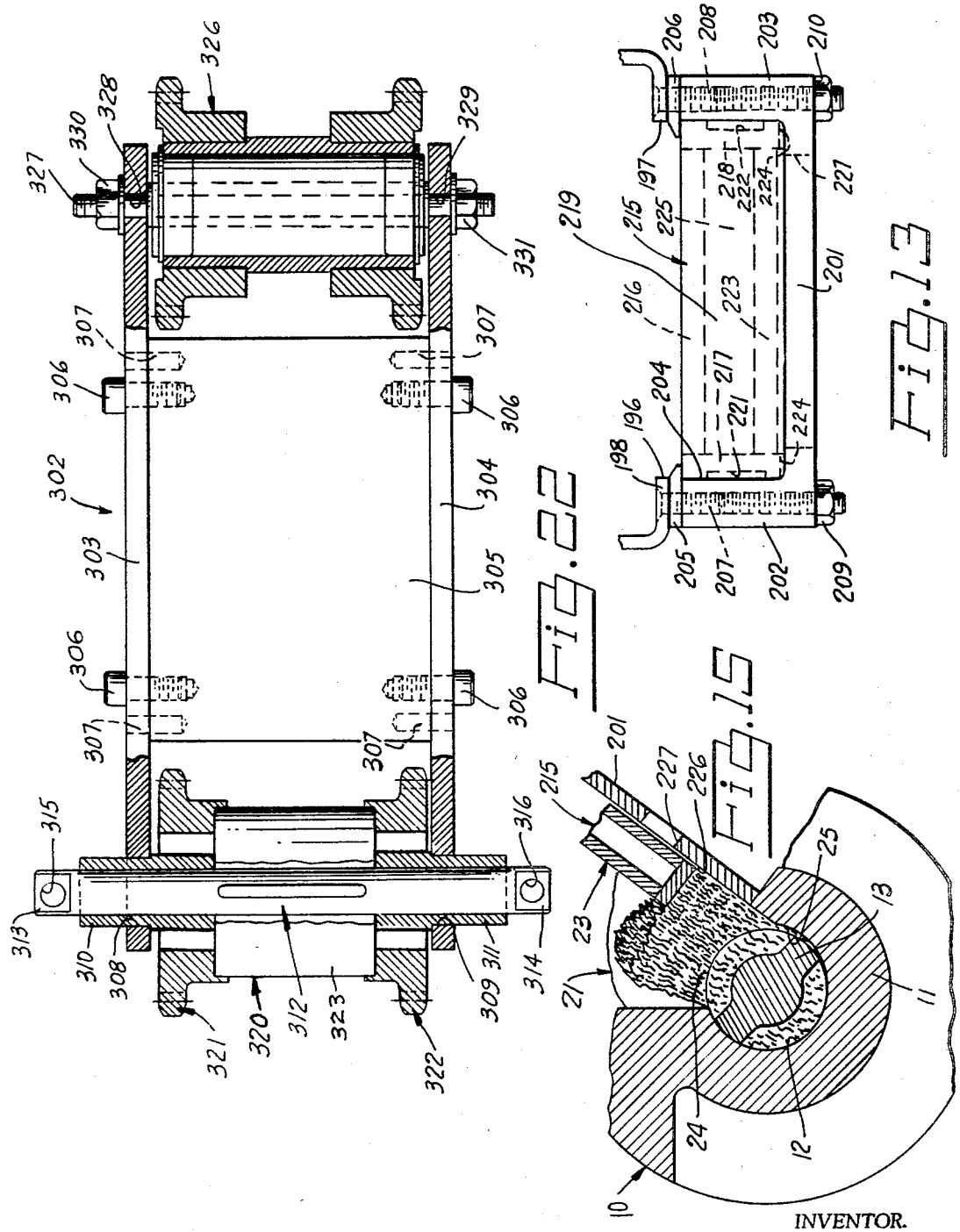

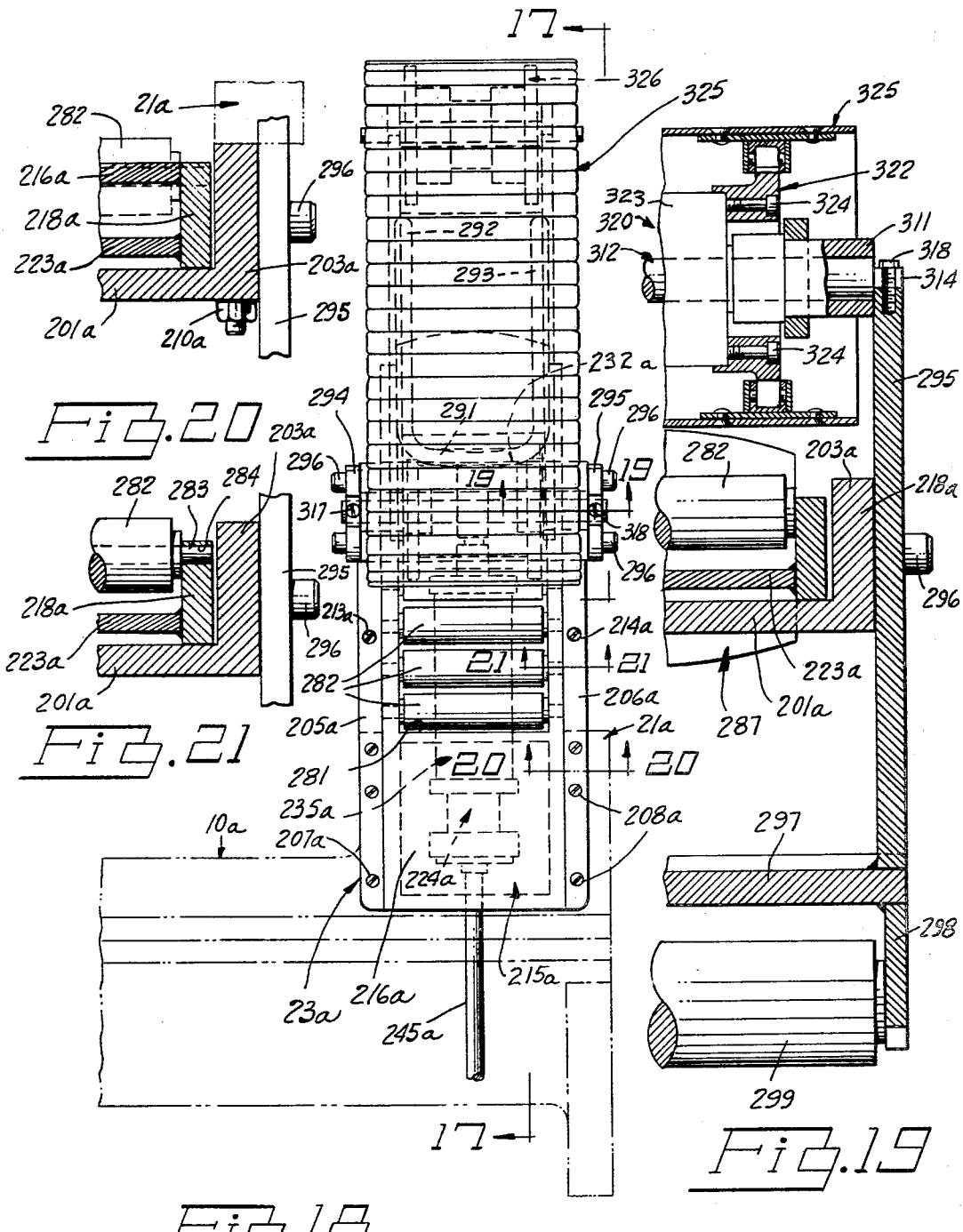

United States Patent Office 3,396,429
Patented Aug. 13, 1968

3,396,429
SELF-FEED RAM FOR EXTRUSION EQUIPMENT
Paul Geyer, Detroit, Mich., assignor to Uniroyal Inc., a corporation of New Jersey
Filed Aug. 1, 1966, Ser. No. 569,225
12 Claims. (Cl. 18—12)

ABSTRACT OF THE DISCLOSURE

The invention is an apparatus for feeding stock to an extrusion machine wherein a ram operatively mounted on the extrusion machine not only feeds stock to the machine but controls the operation of the entire feeding system for the extruder.

---

This invention relates generally to material feeding devices, and more particularly to a self-feeding ram for feeding material, such as a rubber-like compound, to an extrusion machine.

Heretofore, material feeding devices have been provided for feeding cold stock to extrusion machines. However, the prior art material feeding machines have various disadvantages, as for example, the inability of being able to feed a large slab of cold stock into an extrusion machine at a uniform rate. Another disadvantage of some of the prior art material feeding machines is that they employ ram devices which stick to the stock and pull the stock in a reverse direction during a retraction movement. Such action causes a non-uniform input to an extrusion machine. A further disadvantage of some of the prior art material feeding machines is that their ram apparatus is subject to being jammed by the stock being fed into an extrusion machine.

In view of the foregoing, it is an important object of the present invention to provide a novel and improved material feeding apparatus which overcomes the aforementioned disadvantages of the prior art material feeding machines.

It is another object of the present invention to provide a novel and improved material feeding apparatus which is adapted to feed large slabs of cold stock, as for example, rubber-like compound into an extrusion machine at a uniform rate of input.

It is a further object of the present invention to provide a novel and improved material feeding apparatus which senses the level of the stock in the hopper of an extrusion machine, and stops and starts in accordance with the level sensed so as to provide a self-feeding apparatus.

It is still another object of the present invention to provide a novel and improved material feeding apparatus which incorporates a ram constructed and arranged to prevent jamming of the ram during a feeding operation by the stock being fed by the apparatus.

It is still a further object of the present invention to provide a novel and improved material feeding apparatus which is adapted to feed wide strips of cold rubber-like material to an extrusion machine, or which can be adapted to feed narrow strips or strands of said material.

It is still a further object of the present invention to provide a novel and improved material feeding apparatus which is adapted to feed rubber-like compound into an extrusion machine at a uniform input rate, whereby the extrusion machine extrudes stock within precise tolerances, thereby making it possible to produce a more uniform tire than was heretofore possible with the prior art material feeding apparatuses.

It is still another object of the present invention to provide a novel and improved material feeding apparatus for feeding stock in strip form, thread form, strand form, and the like, to an extrusion machine having a hopper with a feed throat communicating with a stock screw in a cylinder, and wherein said apparatus includes a ram means mounted on the hopper for feeding said stock to the feed throat at a uniform rate, said ram means being adapted to sense the level of stock in the hopper and to stop and start automatically to maintain the level, and, means associated with the ram means for co-action with the ram means to draw stock from a stock supply and guide and feed the stock to the ram means.

It is still a further object of the present invention to provide a novel and improved material feeding apparatus for feeding stock in strip form, thread form, strand form and the like, to an extrusion machine having a hopper with a feed throat communicating with a stock screw in a cylinder and which comprises, ram means operatively mounted on said extrusion machine for feeding said stock to the feed throat, means for guiding and feeding said stock to said ram means, and said stock guiding and feeding means being responsive to and controlled by said ram means.

Other objects, features and advantages of this invention will be apparent from the following detailed description, appended claims, and the accompanying drawings.

In the drawings:

FIG. 4 is a fragmentary, enlarged, elevational view of the structure of FIG. 1, taken within the circle marked "4";

FIG. 5 is an enlarged, and elevational view of the structure illustrated in FIG. 4, taken along the line 5—5 thereof, and looking in the direction of the arrows;

FIG. 6 is an enlarged, elevational section view of the structure illustrated in FIG. 4, taken along the line 6—6 thereof, and looking in the direction of the arrows;

FIG. 7 is a side elevational view of one of the parts of the eccentric mechanism shown in FIGS. 4 and 5;

FIG. 8 is a fragmentary, enlarged, elevational view of the feed roll shaft assembly employed in the embodiment of FIG. 1;

FIG. 9 is a fragmentary, elevational section view of the structure illustrated in FIG. 8, taken along the line 9—9 thereof, and looking in the direction of the arrows;

FIG. 10 is a fragmentary, top plan view of the structure illustrated in FIG. 8, taken along the line 10—10 thereof, and looking in the direction of the arrows;

FIG. 11 is a fragmentary, enlarged view of the structure illustrated in FIG. 3, taken along the line 11—11 thereof, looking in the direction of the arrows, and showing the mill hopper entrance of the extrusion machine;

FIG. 12 is an enlarged plan view of the ram structure employed in the first embodiment of the invention, taken along the line 12—12 of FIG. 3, and looking in the direction of the arrows;

FIG. 13 is a front end elevational view of the ram structure illustrated in FIG. 12, taken along the line 13—13 thereof, and looking in the direction of the arrows;

FIG. 14 is an elevational section view of the ram structure illustrated in FIG. 12, taken along the line 14—14 thereof, and looking in the direction of the arrows;

FIG. 15 is a fragmentary schematic view, showing the front end of the ram in a position approaching the forward end of the operating stroke;

FIG. 17 is an elevational view, partly in section, of a second embodiment of the invention, taken along the line 17—17 of FIG. 18, and looking in the direction of the arrows;

FIG. 18 is a top plan view of the structure illustrated in FIG. 17, taken along the line 18—18 thereof, and looking in the direction of the arrows;

FIG. 19 is an enlarged, fragmentary, sectional view of the structure illustrated in FIG. 18, taken along the line 19—19 thereof, and looking in the direction of the arrows;

FIG. 20 is an enlarged, fragmentary, sectional view of the structure illustrated in FIG. 18, taken along the line 20—20 thereof, and looking in the direction of the arrows;

FIG. 21 is an enlarged, fragmentary, sectional view of the structure illustrated in FIG. 18, taken along the line 21—21 thereof, and looking in the direction of the arrows; and, FIG. 22 is an enlarged, sectional view of the structure illustrated in FIG. 17, taken along the line 22—22 thereof, looking in the direction of the arrows, and with parts removed.

EXTRUSION MACHINE

Figure 1:
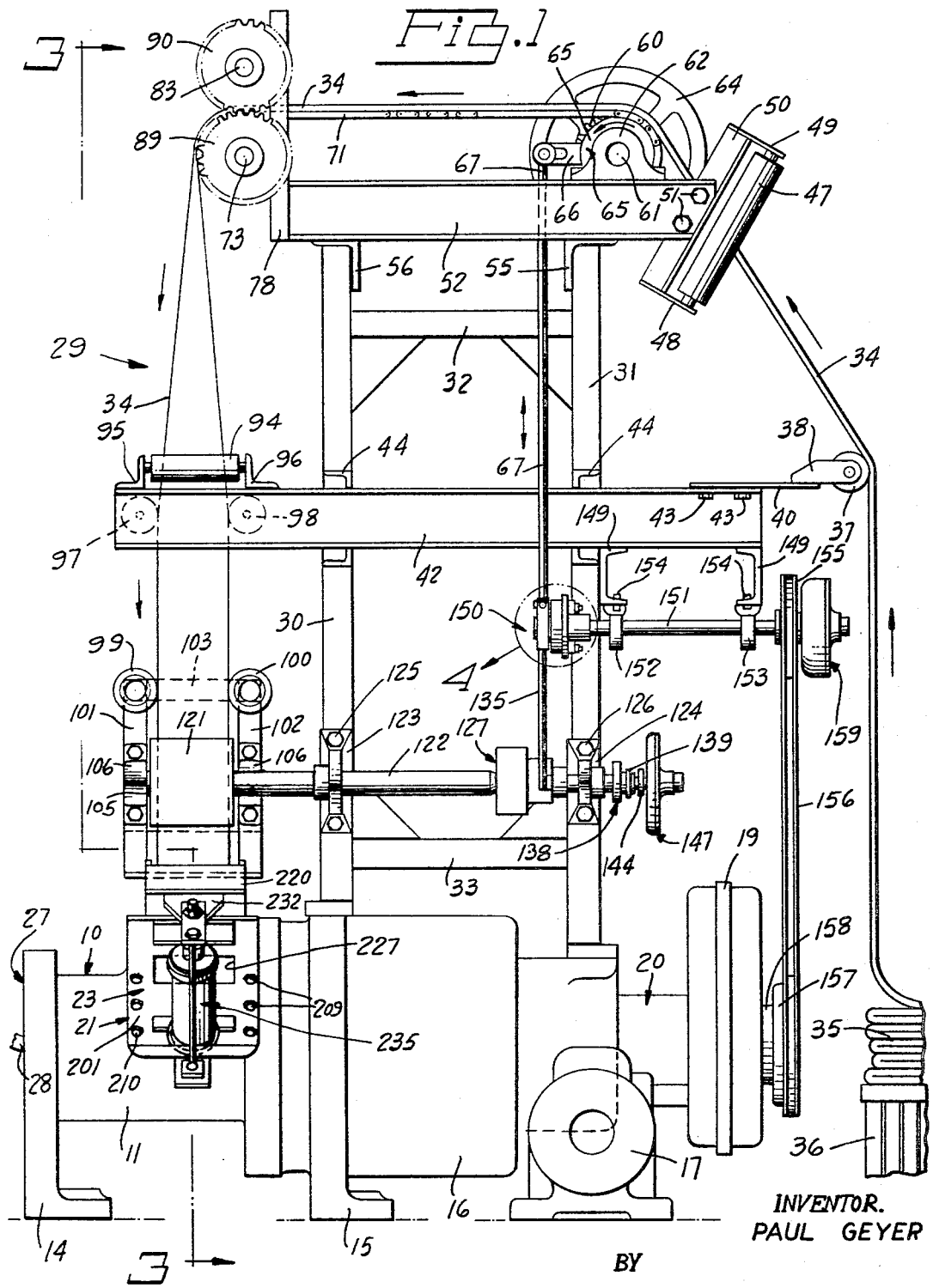
FIG. 1 is a side elevational view of a first embodiment of the invention adapted to feed continuous slab stock from a pile of slab stock to an extrusion machine.
Figure 2:
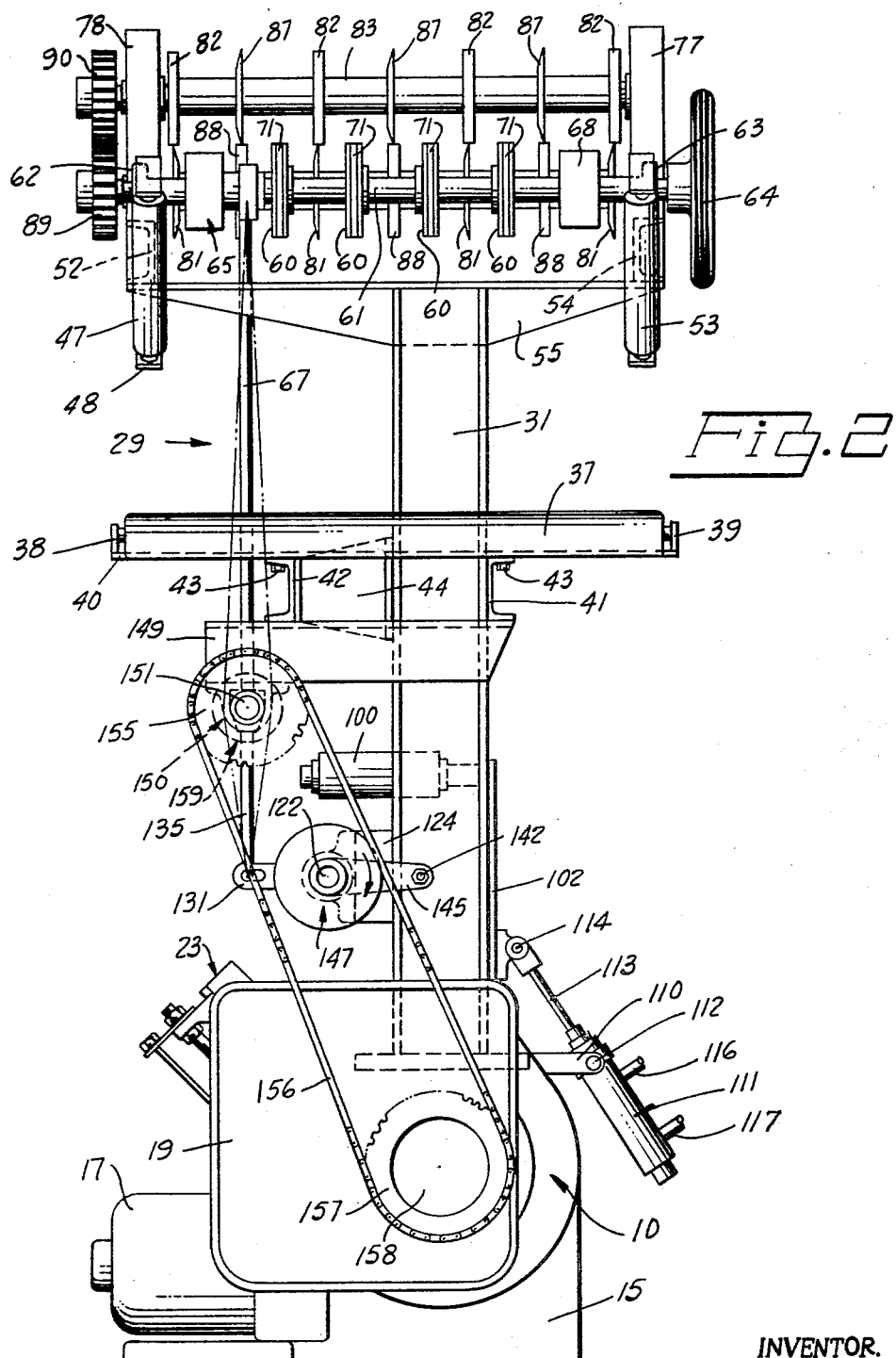
FIG. 2 is a rear end elevational view of the structure illustrated in FIG. 1, taken from the right side thereof.
Figure 3:
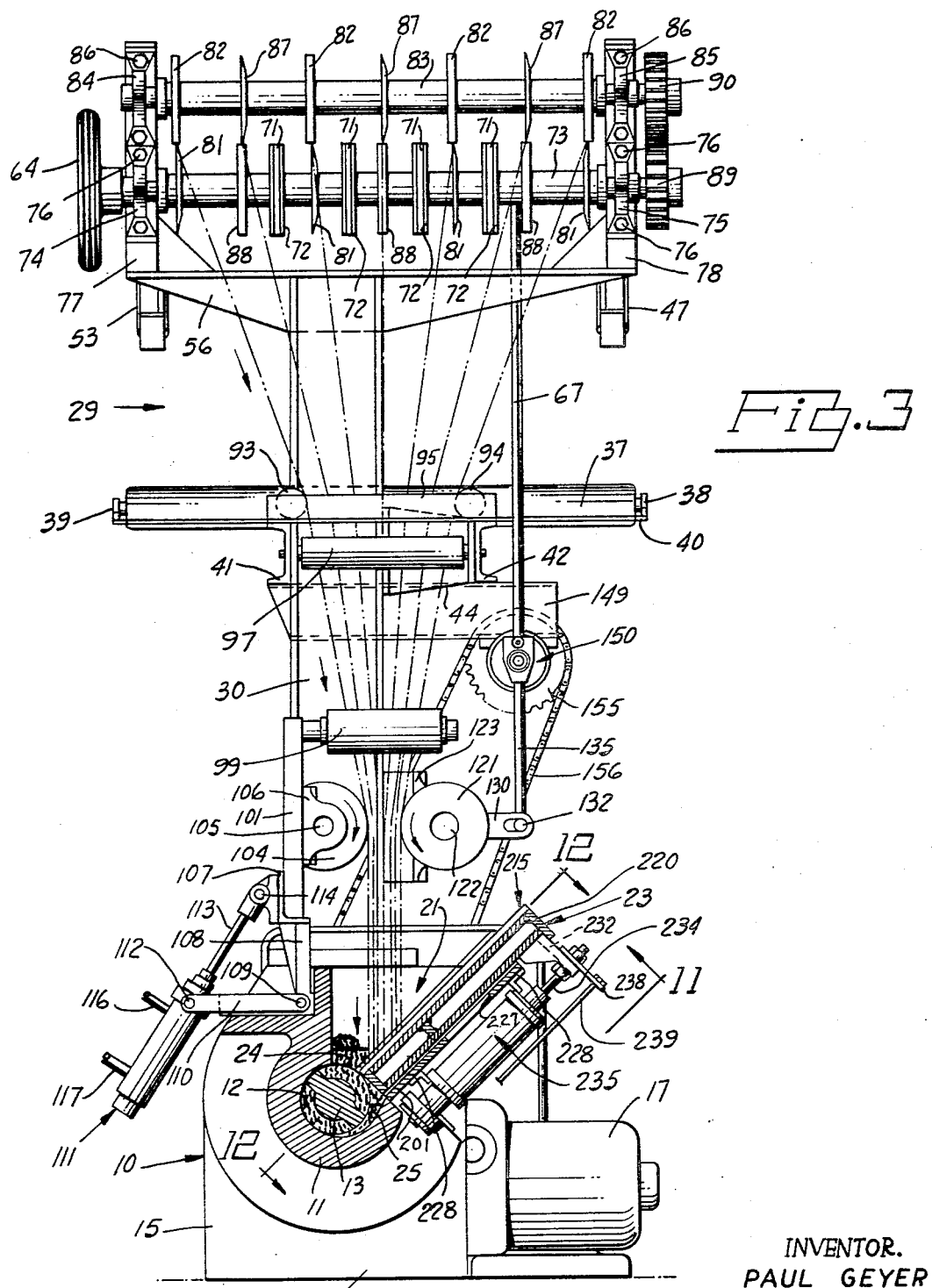
FIG. 3 is a front end elevational view of the structure illustrated in FIG. 1, partially in section, taken along the line 3—3 thereof, and looking in the drection of the arrows.

Referring to the drawings, and in particular to FIGS. 1, 2, and 3, the numeral 10 generally designates an extrusion machine which is provided with a self-feed ram that illustrates a first embodiment of the invention. The extrusion machine 10 is a conventional machine and is illustrative of the type machines with which the self-feed ram of the present invention may be used.

The extrusion machine 10 includes the usual tube, housing or barrel 11 having a bore 12 extending therethrough, as illustrated in FIG. 3. A screw 13 is rotatably mounted in the bore 12. As shown in FIG. 1 the barrel 11 is adapted to be supported by any suitable means, as by the spaced support members 14 and 15. The extrusion machine 10 further includes the thrust bearing 16, which supports the rear end of the screw 13 in the usual manner. As shown in FIG. 1, the screw 13 is adapted to be rotated by a suitable electric motor 17 which is coupled by a reduction gear unit 19 to an extension of the screw 13 as generally indicated by the numeral 20.

As shown in FIGS. 1 and 3, the extrusion machine 10 is provided with the usual hopper generally indicated by the numeral 21. As shown in FIG. 11, the hopper 21 is provided with an opening on one side thereof, in which is mounted a ram 23 made in accordance with the principles of the present invention. The ram 23 is shown in FIG. 3 and illustrates a first embodiment of the invention. As shown in FIG. 3 the barrel 11 is provided with a feed throat or opening 24 in the top side thereof, in a position spaced apart from the discharge end 27 of the barrel, through which the stock to be milled is introduced into the mill from the hopper 21. The barrel opening 24 communicates with the bore 12 through a crescent shaped recess 25 so that stock will be drawn under the screw 13 and be forced along the extrusion barrel 11 to the discharge end 27, as viewed in FIG. 1. The stock is mixed and worked in the usual manner by the extrusion machine 10 and is extruded through the discharge end 27 of the extrusion machine where it emerges as a continuous strip of material 28. The strip of material 28 is then fed to a further processing machine as for example, if the stock being milled is a rubber compound the strip of material 28 may be fed to a tire tread stock processing line.

SELF-FEED RAM EMBODIMENT OF FIGS. 1–16

FIGS. 1–16 illustrate a first embodiment of the invention which is adapted to guide and feed a continuous wide strip of material such as rubber stock into an extrusion machine. As shown in FIG. 1, the numeral 29 generally designates the means for guiding and feeding a wide strip of stock from a supply source to the ram 23 for supplying stock to the ram which in turn feeds it into the extrusion machine 10. The strip stock guiding and feeding means 29 is mounted on a frame that includes the longitudinally spaced vertical channel members 30 and 31 which have their lower ends secured to the extrusion machine 10 by any suitable means, as by welding. The frame channel members 30 and 31 are fixed together by any suitable means, as by the transverse braces 32 and 33.

As shown in FIG. 1, the guiding and feeding means 29 directs a strip of wide rubber stock 34 upwardly from a supply 35 which is folded in a pile on a suitable support, as for example a pallet 36, disposed to the rear of the extrusion machine 10. The strip stock 34 moves upwardly over the guide roller 37 which is rotatably mounted between the support plates 38 and 39, as shown in FIGS. 2 and 3. As shown in FIG. 2, the guide roller support plates 38 and 39 are fixed to the horizontal plate 40 which is secured to the rear ends of a pair of laterally spaced horizontal support channel members 41 and 42 by the screws 43. The channel member 41 is fixed to the vertical frame channel members 30 and 31 by any suitable means, as by welding. The channel member 42 is fixed by a pair of channel brackets 44 to the front sides of the vertical channel members 30 and 31.

The strip stock 34 moves upwardly from the guide roller 37 between a pair of vertically disposed guide rollers 47 and 53, as shown in FIG. 2. As shown in FIG. 1, the guide roller 47 is journaled between a pair of vertically spaced apart support plates 48 and 49 which are fixed to an angle bar 50 that is secured to a front horizontal frame channel rail 52 by a plurality of screws 51. The vertical guide roller 53 is secured to a spaced apart rear horizontal frame channel rail 54. As shown in FIG. 1, the front horizontal frame channel rail 52 is fixed to the upper ends of the frame vertical channel members 30 and 31 by the transverse frame angle bars 55 and 56. As shown in FIG. 2, the rear horizontal frame channel rail 54 is fixed to the transverse frame angle bar 55. The transverse frame angle bar 56 also supports the rear frame channel rail 54.

As shown in FIG. 1, the strip stock 34 passes between the guide rollers 47 and 53 and thence upwardly and forwardly over a sprocket and chain means which is shown in detail in FIG. 2. As shown in FIG. 2, the sprocket and chain means includes four laterally spaced apart sprockets 60 which are operatively mounted on a transverse shaft 61 that is rotatably mounted by suitable journal members 62 and 63 which are fixed on the top sides of the longitudinally extended channel rails 52 and 54, respectively. A hand wheel 64 is fixed on the rear end of the shaft 61 for setup purposes, including threading a new strip of stock into position.

As shown in FIG. 2 the drive means for the sprocket and chain means shaft 61 comprises a suitable directional reciprocating overrunning clutch generally indicated by the numeral 65. As shown in FIG. 1, the clutch 65 is adapted to be operated by a lever 66 which is in turn operated by the pivotally connected, vertically disposed drive rod 67. It will be understood, that any suitable overrunning clutch may be employed. A suitable clutch is one available on the market from the Hillard Company, type number 1, size D4. The drive rod 67 is operated by a power drive means which will be described in detail hereinafter.

As shown in FIG. 2, an annular spacer 68 is operatively connected in the shaft 61 for spacing purposes. As shown in FIGS. 1, 2, and 3, an endless chain 71 is mounted around each of the sprockets 60 and each of these chains is extended forwardly in a horizontal position for engagement with a mating sprocket 72 mounted on a transverse shaft 73 on the forward end of the stock feeding and guiding frame structure. It will be seen that the last described sprocket and chain means feeds the strip stock forwardly to a position over the hopper 21.

As shown in FIG. 3, the shaft 73 has the ends thereof journaled in suitable pillow blocks 74 and 75 which may be secured by any suitable means, as for example, the screws 76, to the front sides of a pair of vertical channel members 77 and 78, respectively. The channel members 77 and 78 are secured, as by welding, to the front ends of the longitudinal channel rails 52 and 54.

As shown in FIG. 3, the shaft 73 has fixed thereon a plurality of rotary cutters, comprising the four circular cutters 81, which are mounted in spaced apart position along the shaft 73. The circular cutters 81 are adapted to co-act with an equal number of discs 82 which have flat peripheral surfaces to form a backing means for the cutters 81. The backing discs 82 are fixed on a transverse shaft 83 which is mounted in a vertically spaced position above the shaft 73. The ends of the shaft 83 are suitably journaled in the pillow blocks 84 and 85 which are secured by any suitable means, as by the screws 86, to the upper ends of the vertical channel members 77 and 78, respectively.

As shown in FIG. 3, the shaft 83 also carries a plurality of circular cutters 87 which are identical to the cutters 81, and which are interspersed between the backing discs 82. The cutters 87 are adapted to co-act with an equal number of backing discs 88 mounted on the lower shaft 73 in interspersed positions between the cutters 81 and the sprockets 72. The upper shaft 83 is driven in unison with the lower shaft 73 by means of the drive pinion 89 mounted on the front end of the shaft 73. The pinion 89 is meshed with and drives the pinion gear 90 fixed to the front end of shaft 83. It will be understood, that the cutters 81 and 87 co-act with their respective backing members 82 and 88, respectively, so that the strip of rubber stock 34 is alternately scored from one side and then the other to induce an accordion pleating effect on the strip stock.

As best seen in FIGS. 1 and 3, the scored strip stock is directed downwardly between an upper pair of horizontally disposed guide rollers 93 and 94 and a lower pair of horizontal guide rollers 97 and 98. The guide rollers 93 and 94 are longitudinally disposed and are operatively journaled on a pair of spaced apart horizontal angle bars 95 and 96 which are fixed, as by welding, to the front ends of the longitudinal frame channel members 41 and 42. The second pair of horizontal guide rollers 97 and 98 are disposed transversely, or perpendicularly to the axis of the first set of guide rollers 93 and 94. The guide rollers 97 and 98 are suitably journaled between the longitudinal frame channels 41 and 42.

As illustrated in FIGS. 1 and 2, the scored material is moved downwardly from the guide rollers 93 and 94, 97 and 98 between a pair of gather rolls 99 and 100, and then between a squeeze roll 104 and a drive roll 121, for feeding the folded strip stock into the mill hopper 21.

As best seen in FIG. 1, the gather rolls 99 and 100 are rotatably mounted in a suitable manner on the upper end of a pair of vertically disposed spaced apart bars 101 and 102, respectively. The upper ends of the bars 101 and 102 are fixed together by a cross brace 103.

As best seen in FIG. 3, the squeeze roll 104 is rotatably mounted for free rotation on the shaft 105. The shaft 105 has the ends thereof rotatably mounted in suitable journal members 106 on the vertical bars 101 and 102, as shown in FIG. 1. The lower ends of the bars 101 and 102 are fixed to a horizontal angle bar 107 by any suitable means, as by welding. The angle bar 107 is fixed to a vertical leg 108 that has the lower end thereof pivoted at the point 109 on a horizontal support member 110 which is fixed to the extrusion machine 10.

The squeeze roll 104 is adapted to be swung inwardly and outwardly by a suitable air cylinder generally indicated by the numeral 111. The rod end of the cylinder 111 is pivotally mounted at the point 112 at the outer end of the support member 110. The cylinder rod 113 is pivotally connected at the point 114 to the outer side of the angle bar 107. Pressurized air is adapted to be selectively admitted to the conduits 116 and 117 for pivoting the frame structure carrying the squeeze roll 104 and the gather rolls 99 and 100 in a clockwise direction as used in FIG. 3 for exerting pressure against the scored material as it is moved downwardly, and for co-action with the drive roll 121. The operation of the cylinder 101 will be more fully described in detail hereinafter.

The drive roll 121 is powered from the same power source employed for operating the extrusion machine 10. As shown in FIG. 1, the drive roll 121 is mounted on one end of a horizontal drive shaft 122 which is rotatably mounted in suitable pillow blocks 123 and 124 that are fixedly secured to the front side of the frame vertical channel members 30 and 31 by any suitable means, as by the screws 125 and 126, respectively.

As best seen in FIG. 8, the drive shaft 122 is rotated by means of a suitable overrunning clutch generally indicated by the numeral 127. The clutch 127 may be of any suitable type and it would be the same as the overrunning clutch 65 employed for driving the sprocket and chain means shaft 61. As shown in FIG. 8, the overrunning clutch 127 is operatively mounted on a reduced end portion of the shaft 122, and it includes a reduced diameter portion 128 on which is fixed, by any suitable means, a collar 129 carrying a clutch operating lever 130. The clutch operating lever 130 is provided with a longitudinally extended slot 131 in which is adjustably mounted an attachment screw 132 for attaching the lever 130 to the eye end of a connection screw 133. The other end 134 of the screw 133 is threadably mounted in the lower end of a clutch operating rod 135. The clutch operating rod 135 is operated by an eccentric means, generally indicated by the numeral 150 in FIG. 1, in a manner more fully described in detail hereinafter.

As shown in FIG. 8, the shaft 122 is provided with a second overrunning clutch generally indicated by the numeral 138. The clutch 138 is identical to the clutch 127 and is adapted to anchor the shaft 122 so that the shaft will be permitted to be turned forward in one direction by the clutch 127 but will be prevented from being turned backwards in the other direction by the pull of the stock on the drive roll 121.

The clutch 138 is provided with a reduced portion 139 which has fixed thereto an anchor lever 140, as shown in FIG. 10. As shown in FIG. 10, the clutch anchor lever 140 is fixed to the outer end of an anchor arm 141 which has the other end secured to the frame vertical channel member 31 by any suitable means, as by welding. The anchor lever 140 is fixed to the anchor arm 141 by an elongated screw 142 and the lock nut 143.

As best seen in FIGS. 8 and 10, the drive roll shaft 122 is further provided with a clutch brake generally indicated by the numeral 147. The clutch brake 147 may be of any suitable type. A suitable clutch is one that is available on the market from the Bellows-Valvair Company of Akron, Ohio, model No. BVC-6. The clutch brake 147 is provided with an anchor arm 145 that is secured to the outer end of the anchor screw 142 by the lock nuts 146.

As shown in FIG. 1, the eccentric means 150 is operatively mounted on one end of a drive shaft 151 that is rotatably mounted on a pair of transverse channel members 149 by any suitable means, as by the journal members 152 and 153 and the screws 154. The transverse channel members 149 are secured to the lower sides of the longitudinal frame channel members 41 and 42 by any suitable means, as by welding.

As shown in FIG. 1, the eccentric means drive shaft 151 is adapted to be rotated by a sprocket 155 that is fixed on the rear end of the shaft 151 by any suitable means. The sprocket 155 is driven by an endless chain 156 which is driven by a sprocket 157 that is operatively mounted on an output shaft 158 of the reduction gear unit 19. The shaft 151 also is provided with a clutch brake generally indicated by the numeral 159 in FIGS. 1 and 2. The clutch brake 159 would be identical to the clutch brake 147, and any suitable clutch brake may be used.

The eccentric drive means 150 is shown in detail in FIGS. 4, 5, 6, and 7. The eccentric drive means 150 includes the circular plate 162, on the back of which is integrally formed an axially extended hub 163 having a pair of opposed flat side surfaces. The hub 163 is provided with an axial bore 164 which also extends through the plate 162. The front end of the drive shaft 151 is adapted to be received within the bore 164 and be secured in place therein by any suitable means, as by the key 165 and the set screw 166, as shown in FIGS. 4 and 6.

The eccentric drive means 150 includes a second circular plate 167 which is mounted on the first mentioned circular plate 162 for lateral or eccentric adjustment relative to the plate 162 and the axis of the drive shaft 151. The circular plate 167 is releasably secured to the plate 162 by a pair of screws 168 and 169, and the nuts 172 and 173, respectively. As best seen in FIGS. 5 and 6, the first mentioned plate 162 is provided with a pair of spaced apart parallel slots 170 and 171 which are disposed on opposite sides of the axis of the plate 162 and the shaft 151. The bolts 168 and 169 extend through the slots 170 and 171. It will be seen that the eccentric plate 167 can be quickly and easily adjusted relative to the plate 162 by loosening the nuts 172 and 173 and adjusting the bolts 168 and 169 in the slots 170 and 171, respectively, as desired. As shown in FIGS. 5 and 6, the circular plate 162 is provided on the front face thereof with a transverse key slot 176 which is adapted to slidably receive the guide key 177 mounted on the rear face of the circular plate 167. The guide key 177 is adapted to be secured in place on the circular plate 167 by means of the two set screws 178 and 179.

As best seen in FIGS. 5 and 7, the circular plate 167 is provided with an eccentrically located bore 180 in which is fixed, by any suitable means, one end of an eccentric shaft 181. The shaft 181 is provided with a suitable bearing member 182 on which is rotatably mounted an eccentric link 183. As shown in FIG. 4, the eccentric link 183 is secured in place on the shaft 181 by the cap 184 and the screw 185. As shown in FIG. 7, the outer end of the shaft 181 is provided with a reduced extension having a pair of flat surfaces 186 which form a projection that is adapted to be seated in a transverse slot 187 formed on the inner side of the cap 184, as indicated in FIG. 5. The screw 185 is adapted to be threadably mounted in the axially disposed threaded hole 188 (FIG. 7) formed in the outer end of the shaft 181.

As shown in FIG. 5, the upper end of the drive rod 135 is threadably mounted in the threaded hole 189 formed in the lower end of the eccentric link 183. The lower end of the overrunning clutch rod 67 is connected by a suitable ball joint structure to the upper end of the eccentric link 183. As best seen in FIG. 5, the upper end of the link 183 is provided with a pair of spaced apart shoulders 190 and 191 between which is disposed the lower end 194 of the rod 67. The rod end 194 is formed with a ball socket so as to receive therein a ball 193 integrally formed on a ball joint shaft 192 that has the ends thereof suitably secured in the link shoulders 190 and 191 in suitable holes formed in said shoulders. The ball joint shaft 192 is secured in place by any suitable means, as for example, the set screw 195.

As shown in FIG. 3, the ram 23 is mounted in an operative position in the hopper 21 so as to engage the folded stock as it is moved into the hopper 21 and force it into the crescent shaped recess 25 for feeding the screw 13.

FIG. 11 is taken along the line 11—11 of FIG. 3, with the ram removed, so as to show the opening 196 in one of the side walls of the hopper 21 in which the ram 23 is mounted. The ram opening 196 is bounded on the sides thereof by the mounting flanges 197 and 198. As shown in FIG. 11, the flanges 197 and 198 are provided with a plurality of holes 199 and 200, respectively, for the reception of screws for securing the ram 23 in place on the hopper in the opening 196.

FIG. 12 is taken substantially along the line 12—12 of FIG. 3 and shows a plan view of the ram 23 and a fragmentary portion of the hopper 21 to show the manner in which the ram 23 is mounted on the hopper 21. FIG. 13 is taken from the left end of FIG. 12 and illustrates the channel-shaped construction of the ram body, and the structure of the ram slide or plunger of the ram construction. As shown in FIG. 13, the ram body or housing includes the bottom plate or wall 201 which is provided on the ends thereof with the integral upwardly extended sidewalls 202 and 203. The ram body walls 201, 202 and 203 form a structure having a channel-shaped cross section, and an elongated rectangular recessed chamber, indicated by the numeral 204, in which is slidably mounted the ram slide or plunger 215. As illustrated in FIGS. 12 and 13, the ram body is provided with a pair of elongated guides 205 and 206 on each side thereof, along the upper edges of the ram slide chamber, for slidably retaining the ram slide or plunger 215 in the ram body.

As illustrated in FIGS. 12 and 13, the ram 23 is seated against the outer faces of the hopper flanges 196 and 197 and are secured thereto by a plurality of screws 207 and 208, and the nuts 209 and 210, respectively. It will be understood, that the screws 207 and 208 pass through the lower ends of the guide members 205 and 206. The upper ends of the guide members 205 and 206 are secured to the ram body side walls 202 and 203, respectively, by the screws 213 and 214, as shown in FIG. 12.

The structure of the ram slide or plunger 215 is illustrated in FIGS. 13 and 14. As shown in FIGS. 13 and 14, the ram plunger 215 includes an elongated top plate or wall 216 which is secured by any suitable means, as by welding, to the right and left walls 217 and 218, respectively. As shown in FIG. 14, the ram slide 215 is further provided with a front end wall 219 and a rear end wall 220, which are secured to the above-mentioned top and side walls by any suitable means, as by welding. It will be seen, that the outer surface of the front end wall 219 provides a ramming surface which is transverse or perpendicular to the direction of sliding movement of the ram plunger 215 in the ram body during a ramming operation. As shown in FIGS. 13 and 14, the ram slide 215 further includes a bottom plate or wall 223 which extends for the entire length thereof, and which has the ends thereof fixed to the inner surface of the end walls 219 and 220 by any suitable means, as by welding. It will be seen that the bottom wall 223 is disposed upwardly above the lower ends of the front end wall 219 and the side walls 217 and 218 so as to provide a recess below the bottom wall 223.

As shown in FIG. 13, the right side wall 217 is provided with an elongated recess 221 on the outer side thereof. The left side wall 218 is also provided with a similar recess 222. As shown in FIGS. 13 and 14, the left side wall 218 is provided with a longitudinally extended recess 224 on the lower end thereof which communicates with the recess under the bottom plate 223. The right side wall 217 is provided with a similar recess 224, as shown in FIG. 13. As shown in FIGS. 12 and 14, the ram slide 215 is provided with an intermediate transverse wall 225 which is fixed to the top and bottom walls 216 and 223, respectively, by any suitable means, as by welding.

As shown in FIGS. 12 through 15, the ram body bottom wall 201 is provided with an escape or discharge opening 227 through which rubber stock caught between the ram plunger 215 and the ram body wall 201 may be discharged to prevent jamming of the ram plunger 215. As shown in FIG. 15, there is a slight clearance indicated by the numeral 226 between the front or leading edge of the ram plunger 215 and the upper surface of the ram body wall 201. During a ramming operation rubber stock slips between the ram plunger 215 and the body wall 201 and if this rubber stock is not discharged the ram plunger 215 will jam in the ram body. However, due to the novel construction of the ram plunger 215, the rubber stock caught under the ram plunger 215 will be moved into the recess below the bottom plate 223 and will be carried rearward up the ram body wall 201 to the discharge or escape hole 227. It will be seen, that the ram structure of the present invention provides a ram which is substantially self-cleaning and prevents jamming of the ram plunger 215 in the ram body.

As shown in FIG. 12, the bottom wall 201 of the ram body is provided with a centrally disposed, elongated slot or opening 229 at the rear end thereof for the reception of an operator means for the ram plunger 215. The ram plunger operator means includes a plate 230 that is attached to the lower side of the bottom wall 223 at the rear end thereof, and in a central location. As best seen in FIG. 14, the plate 230 is secured to the ram plunger bottom wall 223 by a pair of screws 231. Attached to each side of the plate 230, as by welding, is a side plate 233. An end plate 232 is also secured to the plate 230 and the side plates 233. As illustrated in FIGS. 1 and 3, the ram 23 is adapted to be operated by a suitable fluid cylinder, as for example, an air cylinder generally indicated by the numeral 235. The cylinder 235 is provided with the usual piston rod 234 which is connected to the outer end of the plate 232 by any suitable means. As illustrated, the end of the piston rod 234 is threaded and extended through the plate 232 and is secured thereto by the lock nuts 236 and 237, as shown in FIG. 14. As shown in FIG. 3, a plate 238 is also secured to the plate 232 by means of the threaded end of the rod 234. The plate 238 carries a valve control operating arm 239. As shown in FIG. 3, the cylinder 235 is secured to the bottom wall 201 and the ram body by any suitable means, as by the two angle brackets 228. The brackets 228 may be secured to the ram wall 201 and to the cylinder 235 by any suitable means, as by welding.

*Operation*

The ram 23 maintains a surplus of rubber compound at the feed throat 24 of the extrusion machine 10 so that the extrusion machine is always adequately supplied. The ram 23 also forces the rubber compound through the throat 24 into the crescent-shaped area 25 from whence it is moved by the action of the screw 13 through the extrusion machine 10.

Figure 16:
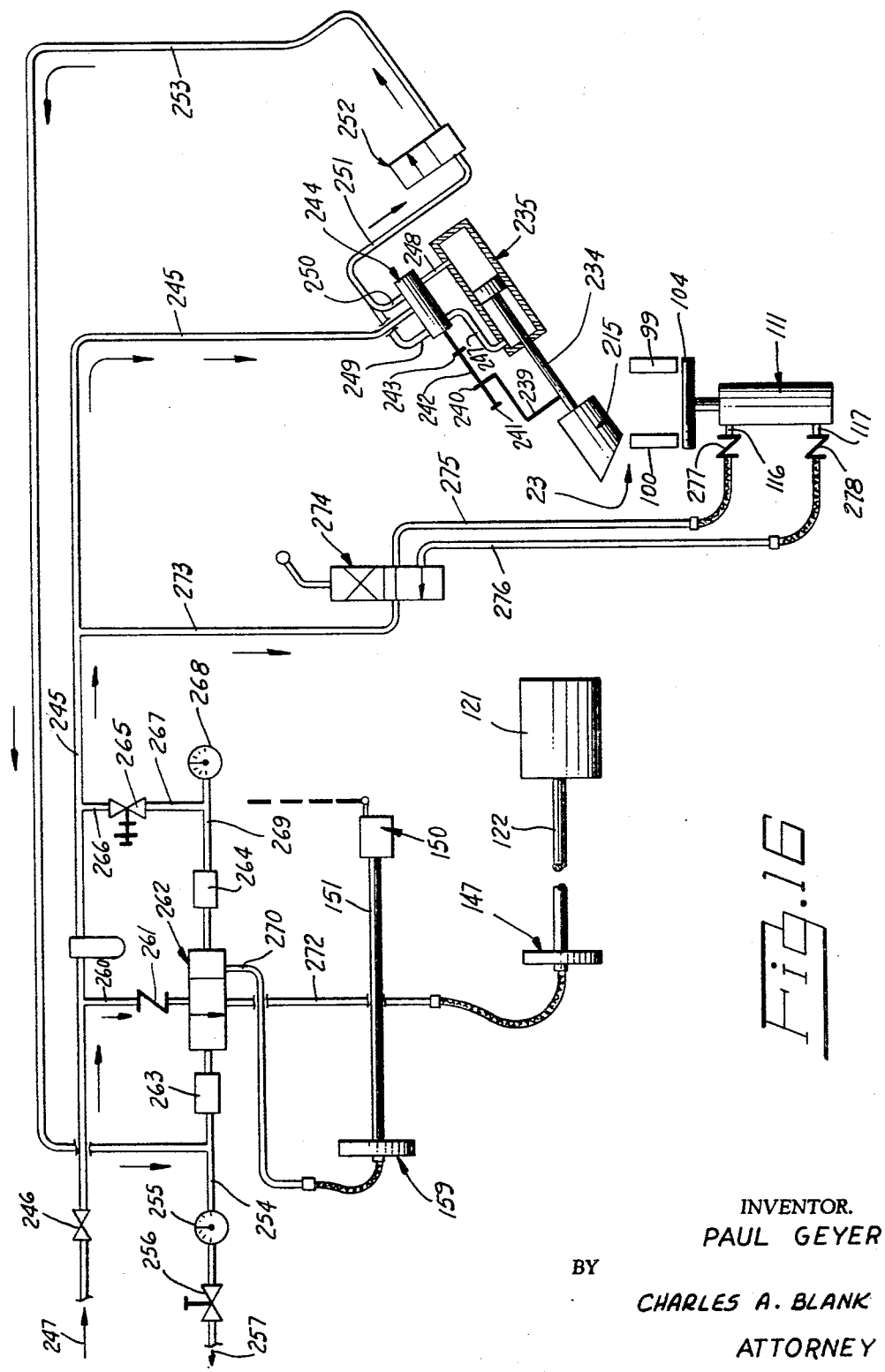
FIG. 16 is a schematic view of an illustrative control circuit for the first embodiment of FIGS. 1 through 15.

The operation of the ram 23 will be explained with the aid of the control circuit of FIG. 16, which is an illustrative circuit that may be employed for operating the self-feeding ram 23, and the means 29 for guiding and feeding strip stock to the hopper 21. As shown in FIG. 16, the air cylinder 235 is adapted to be controlled by a four-way flow control valve 244 which may be of any suitable type, but which is formed as an integral unit with the air cylinder 235 in the aforementioned air cylinder made by the Bellows-Valvair Company. The flow control valve 244 directs the flow of pressurized air into the air cylinder 235 for reciprocating the ram 215, and it also controls the exhausting of the air from the cylinder 235. The flow control valve 244 is operated by a valve operator rod or arm 239. As shown in FIG. 16, a valve operating arm 239 is provided with a trip 240 which is adapted to engage the trip clamps 241 and 243 at the opposite ends of the travel of the ram 215. The trip clamps 241 and 243 are adjustably mounted on the switch control rod or trip rod 242 in positions corresponding to the desired length of travel of the ram 215. Air under pressure is supplied to the flow control valve 244 through the supply line 245 which is connected to a suitable source of pressurized air 247 through a conventional pressure regulator 246. The flow control valve 244 directs the air under pressure into the piston rod or head ends of the cylinder 235 through the flow control lines 247 and 248, respectively. The flow control valve 244 also exhausts the air from the cylinder 235 through either one of the lines 247 or 248 and one of the exhaust lines 249 or 250 to the line 251. The air is then exhausted through the shut-off valve 252 into the exhaust line 253. The exhaust line 253 is exhausted to the atmosphere 257 through the bleed line 254, the gauge 255 and the needle type bleed valve 256. The bleed valve 256 is provided for the purpose of maintaining a predetermined back pressure on the controls for the clutch 159 and the brake 147.

As shown in FIG. 16, the numeral 262 generally designates a flow control valve which supplies working air pressure to the clutch 159 and the brake 147. The valve 262 is supplied with air under pressure from the supply line 245 through the line 260 and the flow control regulator designated by the numeral 261. The valve 262 supplies pressurized air to the clutch 159 for operating the eccentric member 150 by means of the line 270. The valve 262 supplies air under pressure through the line 272 to the brake 147 for braking the drive roll or feed roll 121.

The flow control valve 262 is a three-way valve and is operated by pilot air through the pilot means 263 and 264. The pilot 263 is operated by exhaust air from the exhaust line 253. The pilot 264 is operated by pressurized air from the air supply source 247 through the line 245, the line 266, the air pressure regulator 265, and the lines 267 and 269. The pilot air supply line 269 is provided with an air gauge 268.

In the use of the apparatus of the present invention, the strip stock 34 would first be threaded through the guiding and feeding means 29 to a position with the leading end between the squeeze roll 104 and the drive roll 121. The squeeze roll 104 would be pivoted counterclockwise, as viewed in FIG. 3, to permit the threading of the leading end of the strip stock 34 between the rolls 104 and 121. The backing off or releasing of the squeeze roll 104 is accomplished by manually operating the flow control valve 274 so as to admit fluid under pressure into the inlet line 116 of the roller cylinder 111 to retract the cylinder piston and pivot the squeeze roll 104 away from the strip stock. As shown in FIG. 16, the valve 274 is supplied with pressurized air through the supply lines 245 and 273. The air under pressure is thence conducted through the supply lines 275 and the flow regulator 277 to the cylinder entrance line 116. After the threading operations have been completed the cylinder 111 is operated in a reverse manner to rotate the squeeze roll 104 clockwise as viewed in FIG. 3 for commencement of operations. This action is accomplished by manually operating the valve 274 so as to admit fluid into the line 276 and through the flow regulator 278 and into the supply line 117 for moving the cylinder piston upwardly, as viewed in FIG. 16. The valve 274 reverses the connection with the line 275 and exhausts the same to atmosphere.

The illustrative extrusion machine 10 may be connected in an automatically controlled tuber line for making treads for tires. In such use, the shut-off valve 252 would be incorporated into the control system of the tuber line; and assuming that the tuber line is working, the valve 252 would be in the open position whereby the ram 23 and the guiding and feeding system 29 would be operating in the following manner.

Assuming that the ram plunger 215 would be in the retracted position starting its forward stroke, the pressure in the exhaust line 253 will exert a back pressure on the air pilot 263 to move the main spool of the valve 262 in a direction to admit air under pressure to the clutch 159 for operation of the eccentric 150. Simultaneously, the air pressure would be released from the brake 147 to permit rotation of the drive roll or feed roll 121 in a counterclockwise direction, as viewed in FIG. 3, for feeding the strip stock down into the hopper 21. It will be understood, that the air operated pilot 264 normally operates the valve 262 when the ram plunger 215 is not moving so as to operate the valve 262 to cut off the supply of air to the clutch 159 and admit air to the brake 147. It will be seen that the valve 262 thus operates on a slight air pressure differential which is maintained on the air-operated pilots 263 and 264.

It will be seen, that when the clutch 159 is engaged and the brake 147 is released that the drive shaft 151 will be rotated to operate the eccentric 150 which will in turn operate the rods 67 and 135 upwardly and downwardly through a movement shown in FIG. 2 by the broken lines indicated to the right and to the left of the rods 67 and 135. As shown in FIG. 1, the rod 67 will index the shaft 61 in a counterclockwise direction so as to move the stock 34 forwardly to the pleating cutters 81 and 87. The release of the barke 147 permits the shaft 122 to be indexed in a clockwise direction as viewed in FIG. 2, to rotate the drive roll 121 and feed the stock 34 downwardly in the hopper 21. The overrunning clutches 65 and 127 permit the proper rotational indexing of the shaft 61 and 122. As explained hereinbefore, the clutch 138 prevents the shaft 122 from being moved in a reverse direction during the indexing of the shaft 122 in the driving direction.

It will be seen that the air pressure in the cylinder 235 maintains a pressure on the ram plunger 215 which in turn maintains a constant pressure on the stock in the hopper 21. When enough stock has been accumulated in the hopper so that the stock builds up to a point above the throat opening 24 to a predetermined level, as shown in FIG. 15, in accordance with the setting of the stroke of the ram plunger 215 the ram stops operating. Air pressure in the cylinder 235 maintains a constant pressure on the ram plunger 215, which in turn maintains a constant pressure on the stock in the hopper. The ram plunger 215 stops operating as a practical matter and merely leans against the stock in the hopper 21, trying to press it through the throat 24 and the movement of the cylinder rod stops. The exhaust pressure in the exhaust line 253 which is normally retarded by the bleed valve 256, so as to operate the pilot 263, gradually decays through the valve 256, since the exhaust flow from the cylinder 235 has stopped. When the air pressure in the exhaust line 253 decays to a predetermined point, the air-operated pilot 263 will not be able to maintain the valve 262 in a position to operate the clutch 159, and the air differential between the pilot operators 263 and 264 will increase to the point where the operator 264 will operate to cut off the air supply to the clutch 159 and to admit air to the brake 147 to stop the drive roll 121 and stop the action of the eccentric 150. When the stock in the hopper 21 is carried away by the screw 13 so as to require more stock, the air on the piston end of the cylinder rod 234 will initiate movement of the ram plunger 215 and pressure will build up in the exhaust line 253, and the valve 262 will be reversed to commence operation of the eccentric 150 and the drive roll 121. The stopping and starting action of the ram 23 and the guiding and feeding means 29 is fast and efficient.

It will be seen that the ram of the present invention always maintains a predetermined level of stock in the hopper 21, because the ram automatically senses the level of the stock in the hopper 21 and initiates its own feed action depending upon level of the stock and in the hopper 21. The ram apparatus of the present invention keeps the hopper 21 full of stock to a predetermined level continuously which in turn keeps the extrusion barrel 11 full of stock and stabilizes the extrusion process. The apparatus of the present invention provides a constant feed of the stock into the tuber screw 13 which permits regulating of the extrusion equipment to a close tolerance in regard to the thickness of the extruded stock. For example, with extrusion equipment provided the apparatus of the present invention, it is possible to hold the tolerance to plus or minus one percent of thickness on extruded stock, and this tolerance is much finer than can be provided with the prior art machines. Accordingly, it will be seen that an extrusion machine provided with the ram apparatus of the present invention provides a lower cost and higher quality product. An extrusion machine provided with the ram apparatus of the present invention permits extrusion of rubber-like compounds to more precise specifications than was heretofore possible so as to produce a uniform extrudage. It will also be seen that the apparatus of the present invention provides a machine which is adapted to feed an extrusion machine with wide strip stock which was heretofore not possible with the prior art machines.

SELF-FEED EMBODIMENT OF FIGS. 17 THROUGH 22

FIGS. 17 through 22 illustrate a second embodiment of the invention which is adapted to guide and feed a narrow strip of stock, as for example rubber compound, to an extrusion machine. The apparatus of the second embodiment is also capable of feeding multiple strips of raw stock and stock in strand or thread type forms.

The apparatus of the embodiment of FIGS. 17 through 22 includes a ram substantially similar to the first embodiment, but the stock guiding and feeding means is different. The parts of the second embodiment which are the same as the first embodiment are marked with the same reference numerals followed by the small letter "a."

As shown in FIG. 17, the ram 23a is adapted to be mounted on an extrusion machine as 10a in the same manner as described hereinbefore for the first embodiment of FIGS. 1 through 16. The ram 23a is also adapted to be advanced and retracted by an air cylinder 235a which is identical to the air cylinder 235 of the first embodiment, and which is adapted to be operated by the same type control valve 244a. It will be understood, that the exhaust line for the cylinder 235a will also be provided with a shut-off valve of the same type as the valve 252 of the first embodiment for incorporating the second embodiment in a tuber line.

As shown in FIGS. 17 and 18, one of the differences between the ram plunger 215a of the second embodiment and that of the first embodiment is that the top wall 216a does not extend for the full length of the ram plunger 215a but is terminated at the transverse wall 225a, as indicated by the numeral 281 in FIG. 18. As shown in FIGS. 17 and 18, the ram plunger 215a is provided with a plurality of guide rollers 282 disposed in longitudinally spaced apart positions in the open upper rear end of the ram plunger 215a. As shown in detail in FIG. 21, each of the guide rollers 282 is provided with an end shaft 283 which is rotatably mounted in a hole as 284 in the ram plunger sidewall 218a. It will be understood that the other end of each of the guide rolls 282 is similarly mounted in the other ram plunger sidewall 217a.

As illustrated in FIG. 17, the ram plunger 215a is provided with an extension at the rear end of each of the sidewalls 217a and 218a, as indicated by the numerals 285 and 286, respectively. Rotatably mounted between the wall extensions 285 and 286 is a shaft 288 which carries a ram wheel or roller 287 that is provided with a suitable overrunning clutch adapted to permit rotation of the roller 287 in the direction indicated by the arrow in FIG. 17. Any suitable clutch may be used. A suitable clutch is available on the market from the Hillard Co. under model type 8, size No. 2. The numeral 289 in FIG. 17 generally indicates the dotted line position to which the roller 287 is moved during a working operation, as described more fully hereinafter.

As shown in FIG. 18, a U-shaped guide means is secured to the outer face of the plate 232a on the ram plunger 215a, by any suitable means as by welding. The U-shaped guide means includes a pair of spaced apart, elongated rods 292 and 293 which are integrally connected at their base ends by the bight portion or rod 291.

As illustrated in FIG. 17, a pair of guide roller support plates or arms 294 and 295 are secured to the opposite sides of the ram body by any suitable means, as by the screws 296, shown in FIG. 18. The lower ends of the support plates 294 and 295 are interconnected by a cross plate 297 on which is mounted a pair of outwardly extended support arms 298 between which is rotatably mounted a guide roller 299.

Operatively mounted between the upper ends of the support plates 294 and 295 is another part of the stock guiding and feeding means 29a and it is generally indicated by the numeral 302. The part 302 is a pressure means or belt and co-acts with the ram plunger 215a, as described hereinafter. As shown in FIG. 22, the pressure means 302 comprises a frame having a pair of side plates 303 and 304 which are longitudinally extended, and interconnected by a transverse frame plate or brace 305. The plate 305 is connected to the side plates 303 and 304 by the screws 306 and dowel pins 307.

As shown in FIG. 22, the lower ends of the side plates 303 and 304 are provided with the aligned holes 308 and 309 in which are seated a pair of suitable sleeve bearings 310 and 311. Rotatably mounted in the bearings 310 and 311 is a transverse shaft, generally indicated by the numeral 312, which is adapted to be secured to the upper ends of the support plates 294 and 295, as shown in FIG. 17. As shown in FIG. 22, the ends of the shaft 312 are flattened as indicated by the numerals 313 and 314, and these flattened ends are provided with the holes 315 and 316 for mounting the shaft to the upper ends of the support arms 294 and 295 by means of the screws 317 and 318, as shown in FIG. 18.

As shown in FIG. 22, a drive sprocket assembly 320 is operatively connected to the shaft 312 and it includes a pair of spaced apart sprockets 321 and 322 which carry an overrunning clutch 323. The clutch 323 may be any suitable type of overrunning clutch. A suitable clutch is available on the market from the Hillard Company, type 8, size No. 2.

As shown in FIG. 19, the overrunning clutch 323 is secured to the sprockets 321 and 322 by any suitable means, as by a plurality of screws 324. The sprockets 321 and 322 are adapted to operatively engage the inner surface of, and drive, and endless belt generally indicated by the numeral 325. The endless belt 325 may be of any suitable type, as for example, an endless belt made of a plurality of interconnected transverse plate members.

As shown in FIG. 22, the upper end of the pressure means frame carries an idler sprocket assembly 326 which may be of any suitable type, and which includes a pair of sprockets similar to the sprockets 321 and 322 for engaging the opposite end of the endless belt 325. The idler sprocket assembly 326 is mounted on the shaft 327 that extends through the holes 328 and 329 formed through the frame side plates 303 and 304. The shaft 327 is secured in place by means of the lock nuts 330 and 331.

*Operation*

The ram apparatus illustrated in FIGS. 17 through 22 operates in a manner similar to the first embodiment. The ram plunger 215a is moved upwardly and downwardly by the air cylinder 235a which operates in the same manner as the air cylinder 235. The ram apparatus of the second embodiment is adapted to feed a narrow strip of stock such as rubber compound 34a from a supply 35a mounted on the pallet 36a or the like. It is also adapted to feed stock in multiple strip form or in strand form. The stock 34a is fed up over the guide roller 299 and in between the guide rods 292 and 293, and thence over the guide roller 287 and down the front of the ram plunger 215a over the guide rollers 283 and into the hopper 21a.

Assuming that the ram plunger 215a is in the position shown in FIG. 17, and that more stock is required in the hopper 21a, the air cylinder 235a would retract the ram plunger 215a and move it upwardly as shown in FIG. 17. During the upward movement of the ram plunger 215a the overrunning clutch in the guide roller 287 permits the roller 287 to be rotated in a counterclockwise direction to the position indicated by the dotted line 289. During the upward movement of the ram plunger 215a the endless belt 325 is held stationary by the overrunning clutch 323. The pressure means or pressure belt 302 is rotatably mounted on the shaft 312 and it rests against the guide roller 287 and maintains a pressure thereon by gravity. When the air cylinder 235a reverses the movement of the ram plunger 215a, the overrunning clutch in the guide roller 287 will prevent rotation of the roller 287, but the overrunning clutch 323 will permit rotation of the endless belt 325. Accordingly, as the ram plunger 215a moves downwardly, the length of stock which was moved onto the face of ram plunger during its upward movement will be carried downwardly into the hopper 21a since the endless belt 325 maintains a constant pressure on the ram plunger 215a as it moves downwardly and the belt held stationary relative to the ram plunger, although it is moving in its own endless path. The pressure means belt 325 thus holds the stock which has been moved onto the face of the ram plunger 215a in place as the ram plunger moved downwardly for feeding the same into the hopper 21a. It will be understood, that the ram plunger 215a functions in the same manner as the ram plunger 215 of the first embodiment in that it maintains a predetermined level of stock in the hopper 21a, and it will stop in its feeding travel if the level of stock builds up too high, and then it will continue its travel after more stock is drawn into the barrel 11a by the screw 13a.

It will be seen that both of the disclosed embodiments of the invention provides an intermittent feeding action and in each case the ram is a self-feeding ram and provides a consistent and steady feed of stock to an extrusion machine. The present invention may be used with various extrusion machines and an illustrative machine having a non-cylindrical barrel is shown in U.S. Patent No. 2,744,287, reissued as Re. 26,147. It will be understood, that more than one ram apparatus can be employed on an extrusion machine in a multi-ram, side-by-side or other arrangement.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. In a material feeding apparatus for feeding stock in strip form, thread form, strand form, and the like, to an extrusion machine having a hopper with a feed throat communicating with a stock screw in a housing, the combination comprising:
    (a) ram means operatively mounted on said extrusion machine for feeding said stock to the feed throat;
    (b) means for guiding and feeding said stock to said ram means;
    (c) said means for guiding and feeding said stock including means for scoring the stock to assist in the folding of the stock as it is fed to the ram means; and,
    (d) said stock guiding and feeding means being responsive to and controlled by said ram means.

2. In a material feeding apparatus for feeding stock in strip form, thread form, strand form, and the like, to an extrusion machine having a hopper with a feed throat communicating with a stock screw in a housing, the combination comprising:
    (a) ram means operatively mounted on said extrusion machine for retracting and feeding movements, for feeding said stock to the feed throat;
    (b) means for guiding and feeding said stock from a stock supply to said ram means including means for scoring the stock to assist in the folding of the stock as it is fed to the ram means; and,
    (c) said stock guiding and feeding means being responsive to and controlled by said ram means and comprising, (1) a pressure means engageable with said stock during the retracting and feeding movements of said ram means for guiding and feeding stock onto the ram means during a retracting movement and retaining the stock in position on the ram means during a feeding movement.

3. In a material feeding apparatus for feeding stock in strip form, thread form, strand form, and the like, to an extrusion machine having a hopper with a feed throat communicating with a stock screw in a housing, the combination comprising:
  (a) ram means operatively mounted on said extrusion machine for feeding said stock to the feed throat;
  (b) said ram means including a body having a bottom wall provided with an opening and a plunger slidably mounted in said body and provided with a recess on the lower side to receive stock entering between the plunger and the body and discharge it through said opening;
  (c) means for guiding and feeding said stock to said ram plunger; and,
  (d) said stock guiding and feeding means being responsive to and controlled by said ram means.

4. In a material feeding apparatus for feeding stock in strip form, thread form, strand form, and the like, to an extrusion machine having a hopper with a feed throat communicating with a stock screw in a housing, the combination comprising:
  (a) ram means operatively mounted on said extrusion machine for feeding said stock to the feed throat;
  (b) said ram means including a body having a bottom wall provided with an opening and a plunger slidably mounted in said body and provided with a recess on the lower side to receive stock entering between the plunger and the body and discharge it through said opening;
  (c) means for guiding and feeding said stock to said ram plunger;
  (d) said stock guiding and feeding means being responsive to and controlled by said ram means and comprising,
    (1) powered drive means engageable with said stock for feeding the stock from said stock supply to said ram means; and,
    (2) guide means for guiding the stock during the feeding movement from the stock supply to said ram means.

5. A material feeding apparatus as defined in claim 4, wherein:
  (a) said stock guiding and feeding means includes means for scoring the stock.

6. A material feeding apparatus as defined in claim 5, wherein:
  (a) said means for guiding and feeding said stock includes a plurality of gather rolls for gathering the stock after it is scored.

7. A material feeding apparatus as defined in claim 6, wherein:
  (a) said guide means includes a pivotally mounted squeeze roll and said powered drive means includes a drive roll adapted to co-act with said squeeze roll for feeding the stock from said gather rolls to said ram plunger.

8. In a material feeding apparatus for feeding stock in strip form, thread form, strand form, and the like, to an extrusion machine having a hopper with a feed throat communicating with a stock screw in a housing, the combination comprising:
  (a) ram means operatively mounted on said extrusion machine for retracting and feeding movements for feeding said stock to the feed throat;
  (b) said ram means including a body having a bottom wall provided with an opening and a plunger slidably mounted in said body and provided with a recess on the lower side to receive stock entering between the plunger and the body and discharge it through said opening;
  (c) means for guiding and feeding said stock to said ram plunger; and,
  (d) said stock guiding and feeding means being responsive to and controlled by said ram means and comprising:
    (1) a pressure means engageable with said stock during the retracting and feeding movements of said ram means for guiding and feeding stock onto the ram means during a retracting movement and retaining the stock in position on the ram means during a feeding movement.

9. A material feeding apparatus as defined in claim 8, wherein said pressure means comprises:
  (a) a pivotally mounted endless belt positioned against said ram means and adapted to remain stationary during a retracting movement of said ram means and to move with said ram means during a feeding movement.

10. In a material feeding apparatus for feeding stock in strip form, thread form, strand form, and the like, to an extrusion machine having a hopper with a feed throat communicating with a stock screw in a housing, the combination comprising:
  (a) ram means operatively mounted on said extrusion machine for retracting and feeding movements for feeding said stock to the feed throat;
  (b) said ram means including a body having a bottom wall provided with an opening and a plunger slidably mounted in said body and provided with a recess on the lower side to receive stock entering between the plunger and the body and discharge it through said opening;
  (c) means for guiding and feeding said stock to said ram plunger; and,
  (d) said stock guiding and feeding means being responsive to and controlled by said ram means and comprising,
    (1) a pivotally mounted pressure means comprising an endless belt engageable with said stock during the retracting and feeding movements of said ram means for guiding and feeding stock onto the ram means during a retracting movement and retaining the stock in position on the ram means during a feeding movement.

11. In a material feeding apparatus for feeding stock in strip form, thread form, strand form, and the like, to an extrusion machine having a hopper with a feed throat communicating with a stock screw in a cylinder, the combination comprising:
  (a) ram means operatively mounted on said extrusion machine for retracting and feeding movements for feeding said stock to the feed throat;
  (b) said ram means including a body having a bottom wall provided with an opening and a plunger slidably mounted in said body and provided with a recess on the lower side to receive stock entering between the plunger and the body and discharge it through said opening;
  (c) means for guiding and feeding said stock to said ram plunger; and,
  (d) said stock guiding and feeding means being responsive to and controlled by said ram means and comprising,
    (1) a pivotally mounted pressure means comprising an endless belt engageable with said stock during the feeding and retracting movements of and ram means for guiding and feeding stock onto the ram means during a retracting movement and retaining the stock in position on the ram means during a feeding movement; and,
    (2) a plurality of guide rollers on said plunger adapted to co-act with said endless belt.

12. In a material feeding apparatus for feeding stock in strip form, thread form, strand form, and the like, to an extrusion machine having a hopper with a feed throat communicating with a stock screw in a housing, the combination comprising:

(A) ram means operatively mounted on said extrusion machine for feeding said stock to the feed throat;
(B) means for guiding and feeding said stock from a stock supply to said ram means;
(C) said stock guiding and feeding means being responsive to and controlled by said ram means and comprising;
  (1) powered drive means engageable with said stock for feeding the stock from said stock supply to said ram means; and,
  (2) guide means for guiding the stock during the feeding movement from the stock supply to said ram means;
(D) said powered drive means comprising,
  (1) an endless belt drive mechanism,
  (2) a drive roller; and,
  (3) power driven indexing means for driving said endless belt drive mechanism and drive roller in an intermittent manner, said power driven indexing means comprising,
  (a) clutch means operatively connected to said endless belt driven mechanism and said drive roller;
  (b) a power driven eccentric means connected to said clutch means for providing the endless belt mechanism and drive roller with an indexing driving action; and,
  (c) control means for stopping and starting said eccentric means in response to the feeding action of said ram means.

References Cited

UNITED STATES PATENTS

| | | | |
|---|---|---|---|
| 1,809,983 | 6/1931 | Lodge | 18—12 |
| 1,810,023 | 6/1931 | Lodge | 18—12 |
| 2,579,747 | 12/1951 | Martin | 18—12 |

FOREIGN PATENTS 826,705   1/1960   Great Britain.

WILLIAM J. STEPHENSON, *Primary Examiner.*